(12) United States Patent
Luciano (10) Patent No.: US 12,443,544 B2
(45) Date of Patent: Oct. 14, 2025

(54) APPARATUS, SYSTEM, AND METHOD FOR CONTROLLING HOUSEHOLD APPLIANCES AND REDUCING ENERGY CONSUMPTION THROUGH LOAD CONTROL AND DEMAND MANAGEMENT

(71) Applicant: Dominic Luciano, Wickenburg, AZ (US)

(72) Inventor: Dominic Luciano, Wickenburg, AZ (US)

( * ) Notice: Subject to any disclaimer, the term of this patent is extended or adjusted under 35 U.S.C. 154(b) by 78 days.

(21) Appl. No.: 18/530,309

(22) Filed: Dec. 6, 2023

(65) Prior Publication Data

US 2024/0184719 A1 Jun. 6, 2024

Related U.S. Application Data

(60) Provisional application No. 63/430,391, filed on Dec. 6, 2022.

(51) Int. Cl.
  *G06F 13/12* (2006.01)
  *G06F 13/38* (2006.01)
  *H02J 3/14* (2006.01)

(52) U.S. Cl.
  CPC ............ *G06F 13/12* (2013.01); *G06F 13/385* (2013.01); *H02J 3/144* (2020.01)

(58) Field of Classification Search
  CPC ...................................................... H02J 3/144
  See application file for complete search history.

(56) References Cited

U.S. PATENT DOCUMENTS

| | | | | |
|---|---|---|---|---|
| 4,559,789 A * | 12/1985 | Riek | .................... | F24F 6/04 |
| | | | | 236/46 F |
| 5,663,633 A * | 9/1997 | Kahn | .................... | H03K 17/962 |
| | | | | 323/904 |
| 6,246,831 B1 * | 6/2001 | Seitz | .................... | F24H 15/174 |
| | | | | 219/483 |
| 11,523,488 B1 * | 12/2022 | Recker | ................. | H05B 47/105 |

(Continued)

OTHER PUBLICATIONS

TP-Link, User Guide: Kasa Smart Wi-Fi Slim, Energy Monitoring, Homekit, 2022, TP-Link 1910013215 REV 1.0.1, pp. 1-43 (Year: 2022).*

*Primary Examiner* — Henry Tsai
*Assistant Examiner* — Aurangzeb Hassan
(74) *Attorney, Agent, or Firm* — Bruce A. Lev (57) ABSTRACT

An apparatus, system, and method for controlling household appliances and reducing energy consumption through load control and demand management which includes a PCB module adapted to determine an appliance's power status and power consumption and demand, and which includes a solid state industrial grade primary TRIAC semiconductor, a microcontroller with WiFi capabilities, a number of optotriacs, a current sensor, and three PCB-integrated terminal pads. A PCB module is electrically attached to each respective chosen household appliance, wirelessly connects with each other PCB module in use, and then measures and controls the power consumption of each connected appliance using load control in order to more efficiently track, manage, and conserve household energy use and costs during peak and off-peak household energy use hours, through demand management, automatically and with no user engagement or impact.

11 Claims, 6 Drawing Sheets

(56) References Cited

U.S. PATENT DOCUMENTS

| | | | |
|---|---|---|---|
| 2002/0152298 A1* | 10/2002 | Kikta | H04L 67/125 709/223 |
| 2011/0062933 A1* | 3/2011 | Tosuntikool | H02M 5/2573 200/19.01 |
| 2011/0153246 A1* | 6/2011 | Donaldson | G01R 21/133 702/65 |
| 2014/0062401 A1* | 3/2014 | Gadh | B60L 53/67 320/109 |
| 2015/0057825 A1* | 2/2015 | Steele | H02J 4/00 700/297 |
| 2015/0198938 A1* | 7/2015 | Steele | B25J 9/1689 700/275 |
| 2015/0253364 A1* | 9/2015 | Hieda | H04Q 9/00 702/62 |
| 2015/0276239 A1* | 10/2015 | Fadell | G05B 15/02 236/51 |
| 2015/0276266 A1* | 10/2015 | Warren | H04W 4/70 700/300 |
| 2016/0127875 A1* | 5/2016 | Zampini, II | G01S 5/0226 370/311 |
| 2016/0209899 A1* | 7/2016 | Brantner | H04W 4/80 |
| 2017/0086281 A1* | 3/2017 | Avrahamy | H05B 39/086 |
| 2017/0358988 A1* | 12/2017 | Vaarapuro | H02M 3/33523 |
| 2018/0106501 A1* | 4/2018 | Hinton | F24H 15/37 |
| 2019/0013960 A1* | 1/2019 | Sadwick | G08C 17/02 |
| 2019/0191518 A1* | 6/2019 | Guan | H05B 45/18 |
| 2020/0008050 A1* | 1/2020 | Freeman | G01R 31/74 |
| 2020/0077489 A1* | 3/2020 | Lombardi | H01H 9/02 |
| 2020/0336002 A1* | 10/2020 | Narla | H02J 3/004 |
| 2021/0050725 A1* | 2/2021 | Jensen | H02J 3/388 |
| 2021/0110024 A1* | 4/2021 | Bein | G06F 21/44 |
| 2024/0019174 A1* | 1/2024 | Hill | F24H 15/25 |

\* cited by examiner

APPARATUS, SYSTEM, AND METHOD FOR CONTROLLING HOUSEHOLD APPLIANCES AND REDUCING ENERGY CONSUMPTION THROUGH LOAD CONTROL AND DEMAND MANAGEMENT

CROSS-REFERENCE TO RELATED APPLICATION

The present application is related to and claims priority from prior provisional application Ser. No. 63/430,391, filed Dec. 6, 2022 which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

This invention relates generally to household energy consumption, and more specifically to reducing household energy consumption and demand by controlling the energy use and power state of individual appliances.

2. Description of the Related Art

Prior art control devices used for household appliances are usually formed as 120 VAC "smart switches" and/or "load controllers" that are used to control small 120 VAC appliances and devices. However, they do not and are not controlled with respect to other smart switches and/or load controllers attached to other household appliances. As such, they do not and are not capable of analyzing energy consumption and use of each respective appliance, nor able to control appliances in order to reduce total energy consumption, energy demand, and overall energy costs, within a household. Thus, a need exists for an apparatus, system, and method for controlling household appliances and reducing energy consumption and demand through load control and demand management, and overall energy costs, to avoid the above-mentioned problems.

BRIEF SUMMARY OF THE INVENTION

In view of the foregoing disadvantages inherent in the known types of appliance switches and load controllers or the like in the prior art, the present invention provides a novel apparatus, system, and method for controlling household appliances and reducing energy consumption and demand through load control and demand management. As such, the general purpose of the present invention, which will be described subsequently in greater detail, is to provide an apparatus, system, and method for controlling household appliances and reducing energy consumption and demand through load control and demand management which includes a TRIAC block, a subsystem of the complete PCB module or device, adapted to determine an appliance's power status and power consumption, and which includes an industrial-grade solid state primary TRIAC semiconductor in the TRIAC block that is used for direct load control. Also included on the complete PCB module, and relevant to system function, is a microcontroller with WiFi and internet connectivity capabilities, a number of optotriacs, a current sensor, voltage regulators, and three PCB-integrated terminal pads for screw terminal connection to the chosen appliance. A PCB module is electrically attached to each respective chosen household appliance, wirelessly connects with each other PCB module in use in that home or building through ad hoc WiFi connections and/or an internet-based communications server(s), and then measures and controls the power consumption and demand of each appliance through intelligent load control in order to more efficiently track, manage, and conserve household energy and demand during peak and off-peak household energy use hours with all the advantages of the prior art and none of the disadvantages.

There has thus been outlined, rather broadly, the more important features of the invention in order that the detailed description thereof that follows may be better understood and in order that the present contribution to the art may be better appreciated. The features of the invention which are believed to be novel are particularly pointed out and distinctly claimed in the concluding portion of the specification. These and other features, aspects, and advantages of the present invention will become better understood with reference to the following drawings and detailed description.

There has thus been outlined, rather broadly, the more important features of the invention in order that the detailed description thereof that follows may be better understood and in order that the present contribution to the art may be better appreciated. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, an apparatus, system, and method for controlling household appliances and reducing energy consumption through load control and demand management, constructed and operative according to the teachings of the present invention.

The various embodiments of the present invention will hereinafter be described in conjunction with the appended drawings.

DETAILED DESCRIPTION

As discussed above, embodiments of the present invention relate to an apparatus, system, and method for controlling household appliances and reducing energy consumption through load control and demand management.

Though the concept and design is a close cousin to off-the-shelf 120 VAC "smart switches" and "load controllers" commonly used to control small 120 VAC appliances and devices, this device or module is, in fact, substantially more reliable and advanced in both its hardware and potential firmware capabilities, including alternative industrial grade components, and added features and abilities unable to be found anywhere else. One such example being the main ability to dynamically manage the user's peak demand and lower not just their power bill but their overall energy usage and consumption as well, all with little to no user contact or environmental impact. These modules are installed and wired to specific appliances in the home during module installation, and information and data about the user's power plan, and other relevant data, will be entered during module setup (depending on installed firmware). The installed modules for that building are then privately networked either ad hoc module-to-module via WiFi, via a generic WiFi network hosted by any compatible generic WiFi router, or via dedicated communication servers over the internet, after which they become self-managing and self-sufficient, constantly taking, exchanging, and analyzing collected telemetry between all networked modules in that building as to best manage the user's energy consumption and peak/off-peak demand, intelligently toggling power to specific attached devices to prevent peak demand overages, all without impacting the user's environment or lifestyle.

Figure 1:
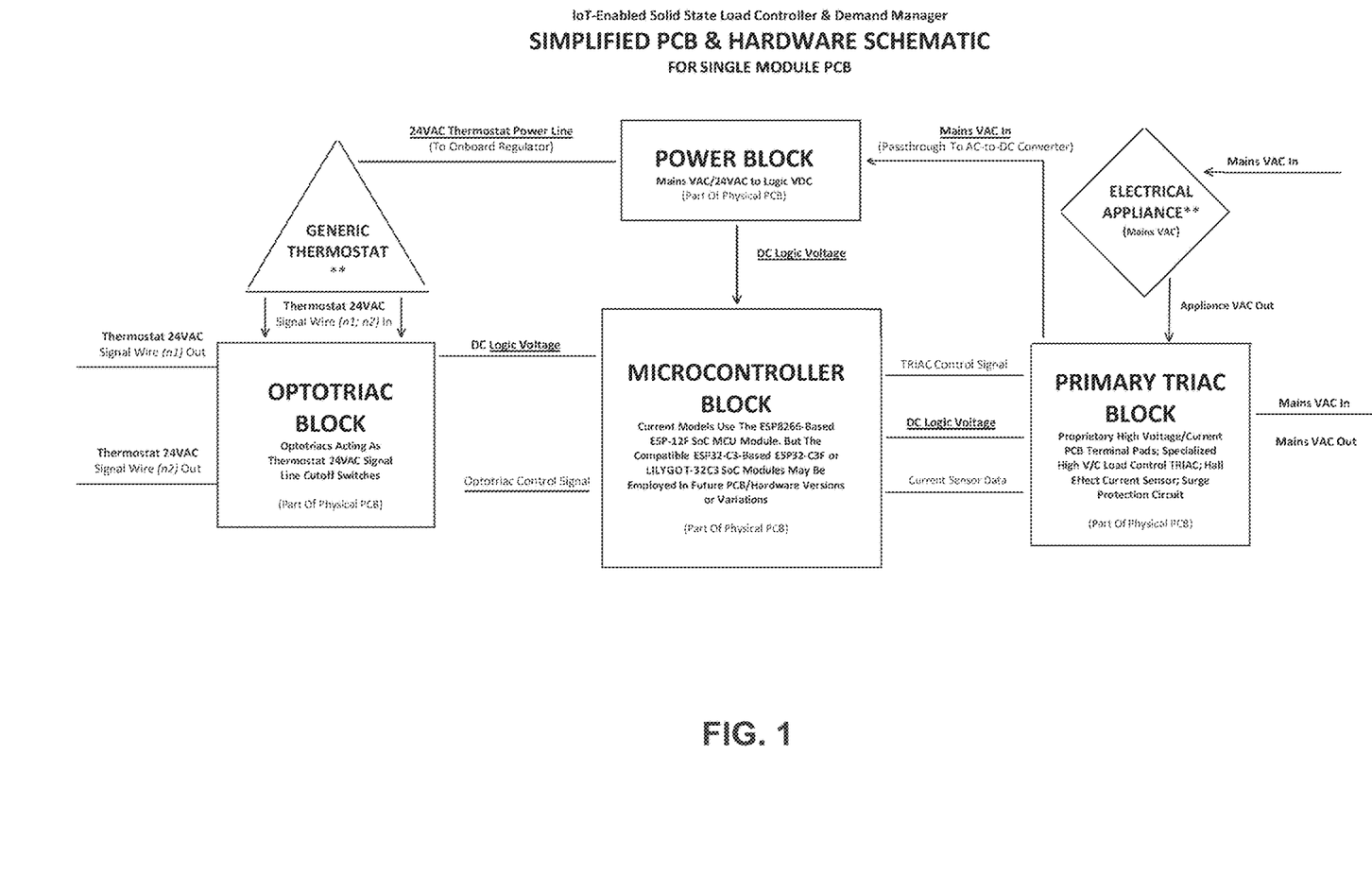
FIG. 1 illustrates a flow chart of the complete apparatus, system, and method for controlling household appliances and reducing energy consumption through load control and demand management according to the preferred embodiment of the present invention.
Figure 2:
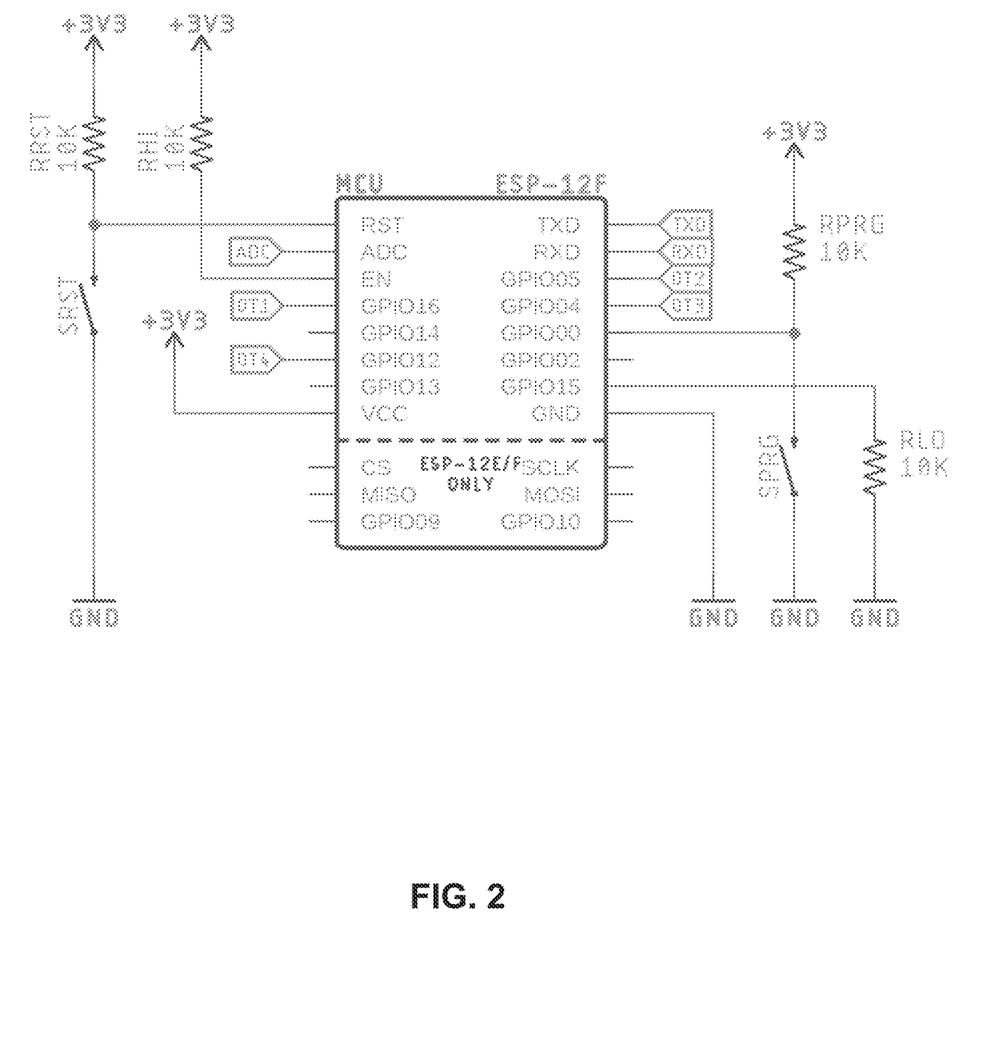
FIG. 2 illustrates schematics of the circuit board of the apparatus for controlling household appliances and reducing energy consumption through load control and demand management according to the preferred embodiment of the present invention.
Figure 3:
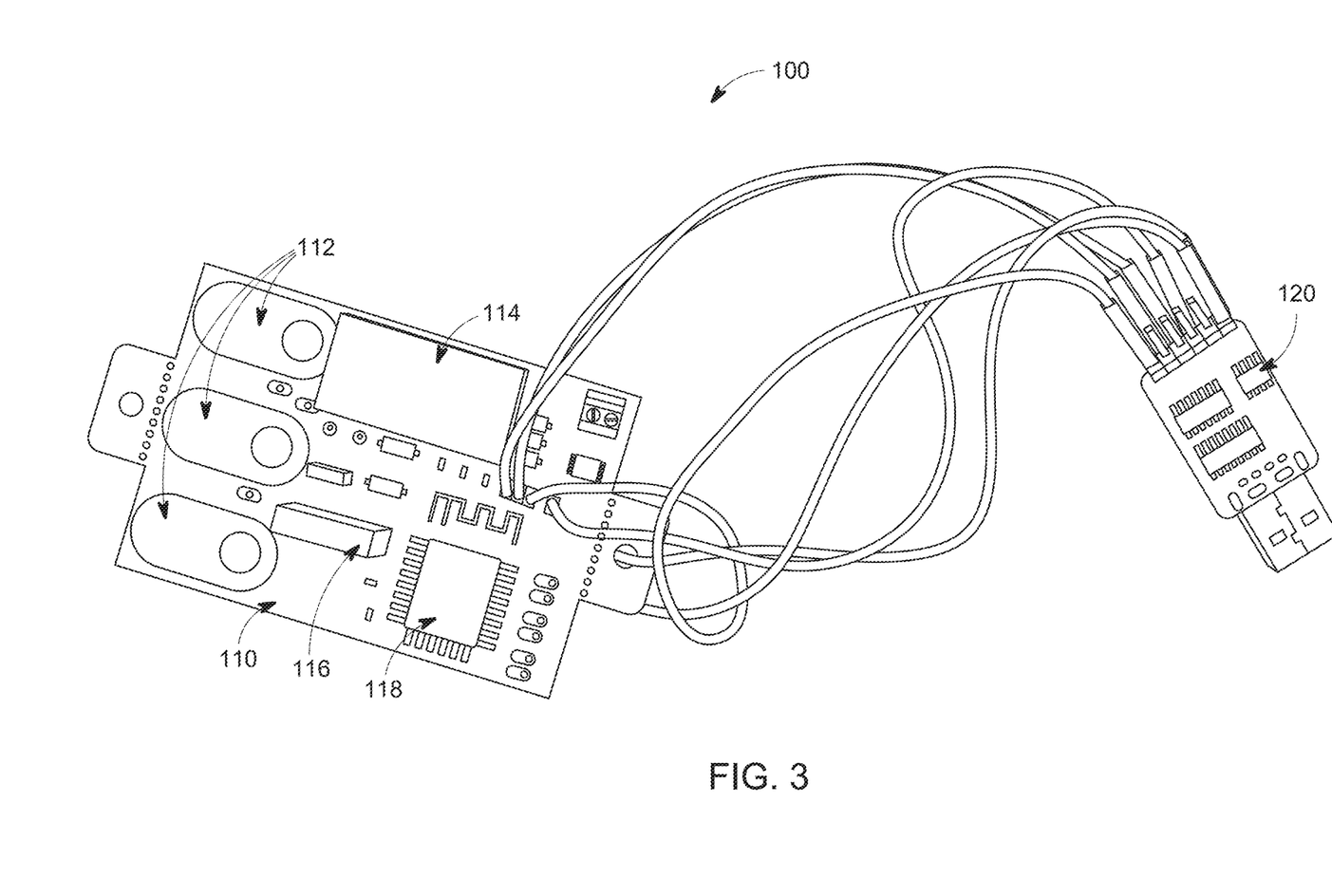
FIG. 3 shows a top view illustrating the complete PCB module according to the preferred embodiment of the present invention.
Figure 4:
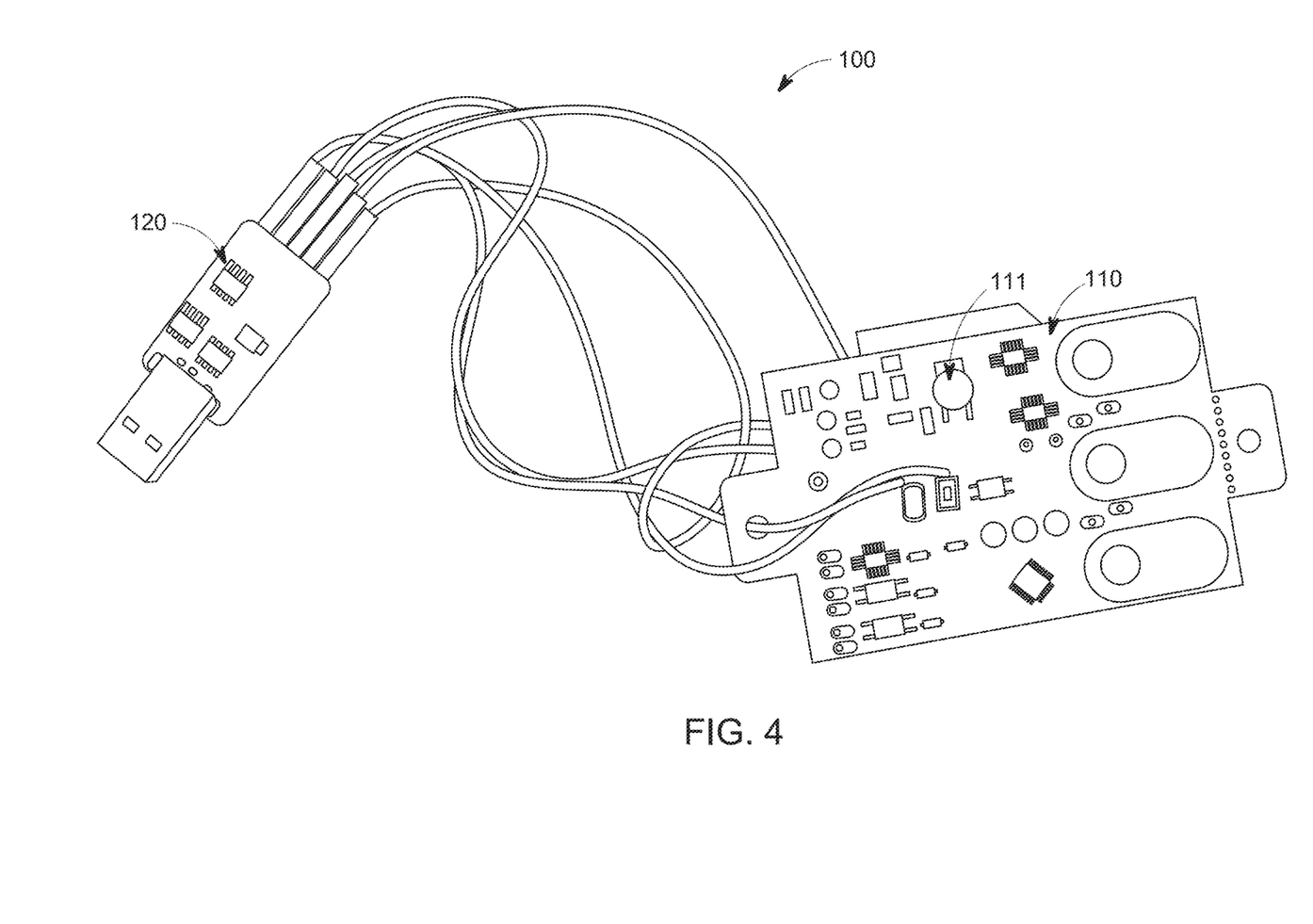
FIG. 4 shows a bottom view illustrating the complete PCB module according to the preferred embodiment of the present invention.

Firstly, this device or module does away with the 10 A to 15 A 120 VAC electromagnetic relays that are commonly used in related devices. Instead, as shown in FIGS. 3 and 4, the instant apparatus 100 includes a primary TRIAC block 110, a subsystem of the PCB module, using a highly specialized, high voltage, high current industrial solid state TRIAC semiconductor 116. This is the primary TRIAC, capable of switching and controlling heavy continuous mains AC loads up to 80 A. And unlike electromagnetic relays whose moving parts and low current capabilities make them unreliable and quick to fail, especially under high current conditions, the primary TRIAC semiconductor 116 used by this module is "solid state" with no moving parts and about 8× the continuous current capabilities of previously utilized relays, making it extremely reliable and dependable with a considerably longer lifespan, even under constant high stress loads. This primary TRIAC's gate is connected to the TRIAC side of a small optotriac, and the LED side of that optotriac then interfaces with the onboard microcontroller 118, providing isolated microcontroller control of the primary TRIAC through the small optotriac. The primary TRIAC block 110 is comprised of the primary TRIAC 116, one small optotriac, three PCB-integrated terminal pads 112 for connecting mains appliances by high current ring terminal directly to the board, an AC-to-DC voltage converter 114 to efficiently convert mains AC voltage to a voltage the system control block can use, and a handful of passive components, such as capacitors, resistors, and metal-oxide varistors. Furthermore, there is an onboard hall effect current sensor 111 attached between the connected mains AC appliance's PCB terminal pad and the primary TRIAC, whose logic side connects to the microcontroller, allowing the microcontroller to track the power state, energy consumption, and overall demand of the attached appliance. This current sensor is also a part of the primary TRIAC block, and one of the most important components on the board as without it there would be no way to determine an appliance's power status, let alone its energy consumption and demand, and when to manage it. The ability to track and manage current draw and power demand of a connected device or appliance is not a feature found on any other related or similar devices to date.

Second, the module is equipped with several small optotriacs capable of directly interfacing with the 24 VAC control lines of a thermostat to control air conditioning systems, as well as heating systems, of any size, even systems with larger current requirements than the primary TRIAC semiconductor may normally be able to handle. The 24 VAC signal lines are connected to the PCB via 2-pin screw terminals that pass through the TRIAC side of the small optotriacs, while the LED side of the small optotriacs interface with the onboard microcontroller, allowing the microcontroller cutoff control of the thermostat's 24 VAC signal lines. This method of indirect load control is original and proprietary to this device or module, and cannot be found in any similar devices to date. The secondary load signal control block is comprised of two small optotriacs and two 2-pin screw terminals used to connect the 24 VAC signal lines, as well as a bridge rectifier for converting the 24 VAC supply into a DC voltage that the system power block can convert to a usable voltage(s).

Last is the system control block, comprised of an ESP8266 based, Wi-Fi capable ESP-12F microcontroller, or similar ESP32-C3 based microcontroller, and a low dropout linear voltage regulator (LDO) for converting the larger DC voltages, output either by the AC-to-DC converter or the 24 VAC voltage rectifier, into a voltage usable by the microcontroller and the system control block's logic components. It also contains a few supporting passive components required for proper microcontroller function, as well as a 4-pin header and two tactile switches required for programming the microcontroller via a USB-to-Serial adapter or other UART interface. The module's potential firmware is also a part of the system control block. Without this block, and especially any application relevant onboard firmware for the microcontroller, the rest of the board will not function. The other components are merely tools for the microcontroller to use to do its job, and almost all present and future features will be added via the microcontroller's firmware, including the proprietary demand management algorithms.

Each complete device or module consists of one double sided PCB with a novel and original shape and design that allows the PCB module to be mounted on or in a single gang outlet junction box. This makes it highly compatible and simple to install with existing installations as it eliminates the need for custom junction boxes and/or wall cutouts. In addition, the top and bottom tabs on the physical PCB can be snapped off, and the entire PCB installed in a low profile, low impact case that can be either easily adhesive or screw mounted next to, or slipped behind, a thermostat for thermostat wiring schemes.

The device or module is a compact yet state-of-the-art, smart IoT-enabled load controller and demand manager, designed to work in tandem with specific electricity and utility company "peak demand" rate plans to lower energy costs by controlling the power state, and the energy consumption and demand, of certain predetermined appliances. When implemented correctly, a complete system of devices or modules will keep the "peak demand" of the residence under a determined limit, during a time period in the day prescribed by the user's particular power utility rate plan, all without impacting the comfort and functionality of the residence.

Each designated appliance will be attached to its own module, and each module will communicate with all other modules in the surrounding environment, either directly unit-to-unit (also known as ad hoc), over a generic WiFi network of any compatible WiFi enabled router, or via a remote MQTT server or similar remote communication server/protocol, as determined by any potential firmware or infrastructure preferences and/or requirements. An internet connected WiFi network provides access for updates and future features. In the event of WiFi and MQTT/communications server connectivity issues, the modules are recommended to fallback and become preset timers until WiFi or other connectivity can be re-established; the finality of this function depends on potential firmware capabilities.

The power system of the module feeds off the connected 120 VAC line, or the 24 VAC lines of the thermostat, and converts that power to a +3.3 VDC output that the majority of onboard electronics run off of, including the ESP-12F (ESP8266 based) or similar microcontroller. However, the ADC on the ESP runs at +1 VDC, so the onboard current monitor's analog +3.3 VDC level voltage output must be converted to +1 VDC via a voltage divider. This lowers the resolution and accuracy of the current monitor, but the data gathered is accurate enough to estimate the power consumption of the connected appliance with a reasonable tolerance and, most importantly, determine if that connected appliance is on or off.

Each unit can be programmed one of three different ways, but can only be programmed initially via any USB-to-Serial or other compatible UART interface FIG. 3, 120. The other two methods of programming are directly "over-the-air" (OTA) via a Wi-Fi network with internet access that pulls the update over the internet from somewhere like an FTP server, or via a local ad hoc unit-to-unit WiFi connection. However, those methods are inaccessible until programmed into any potential firmware. So, adding those methods should be a programming goal. Until added, the module can only be programmed directly via a USB-to-Serial or UART adapter 120.

Figure 5:
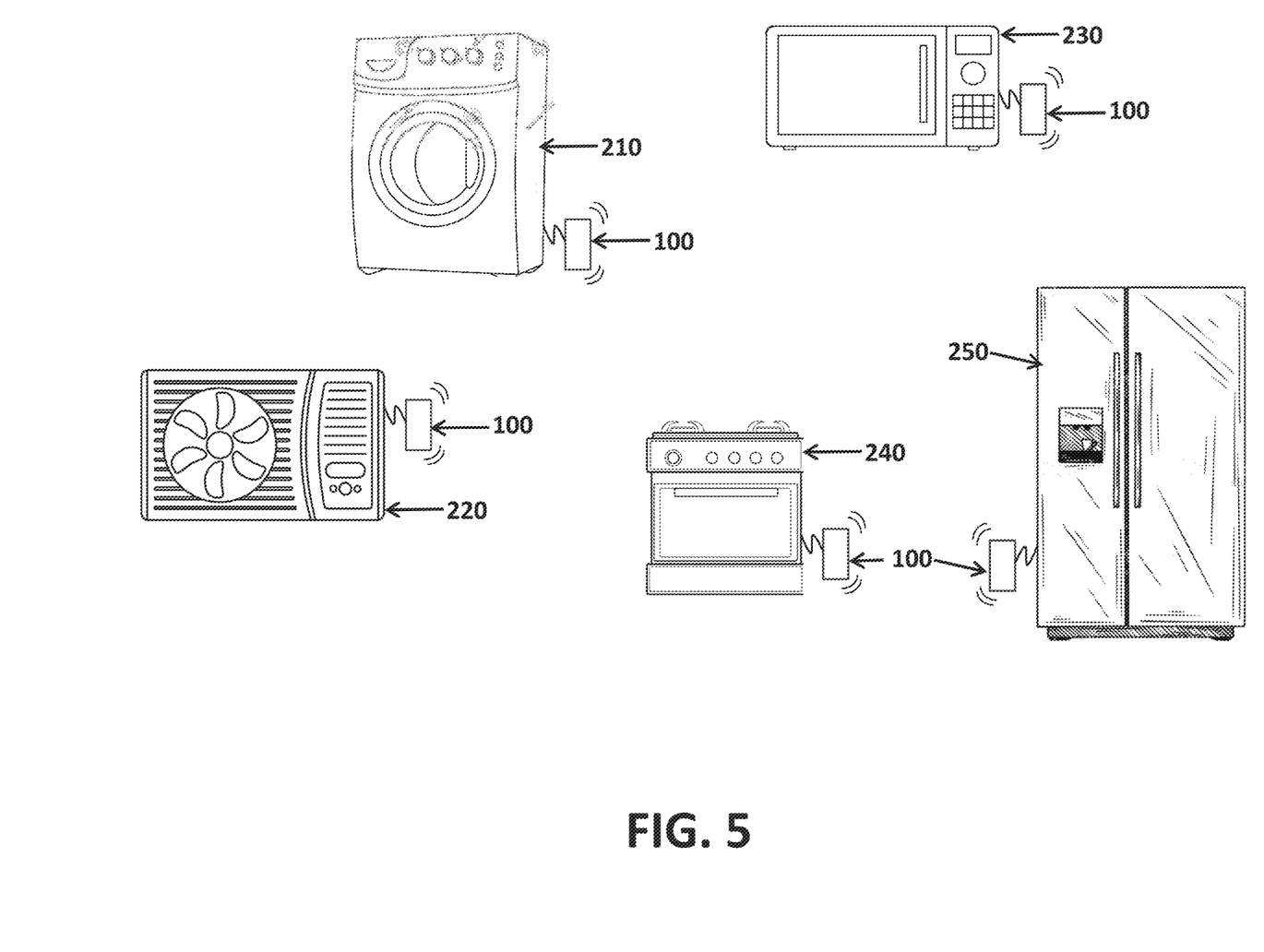
FIG. 5 illustrates PCB modules attached to numerous household appliances according to the preferred embodiment of the present invention.
Figure 6:
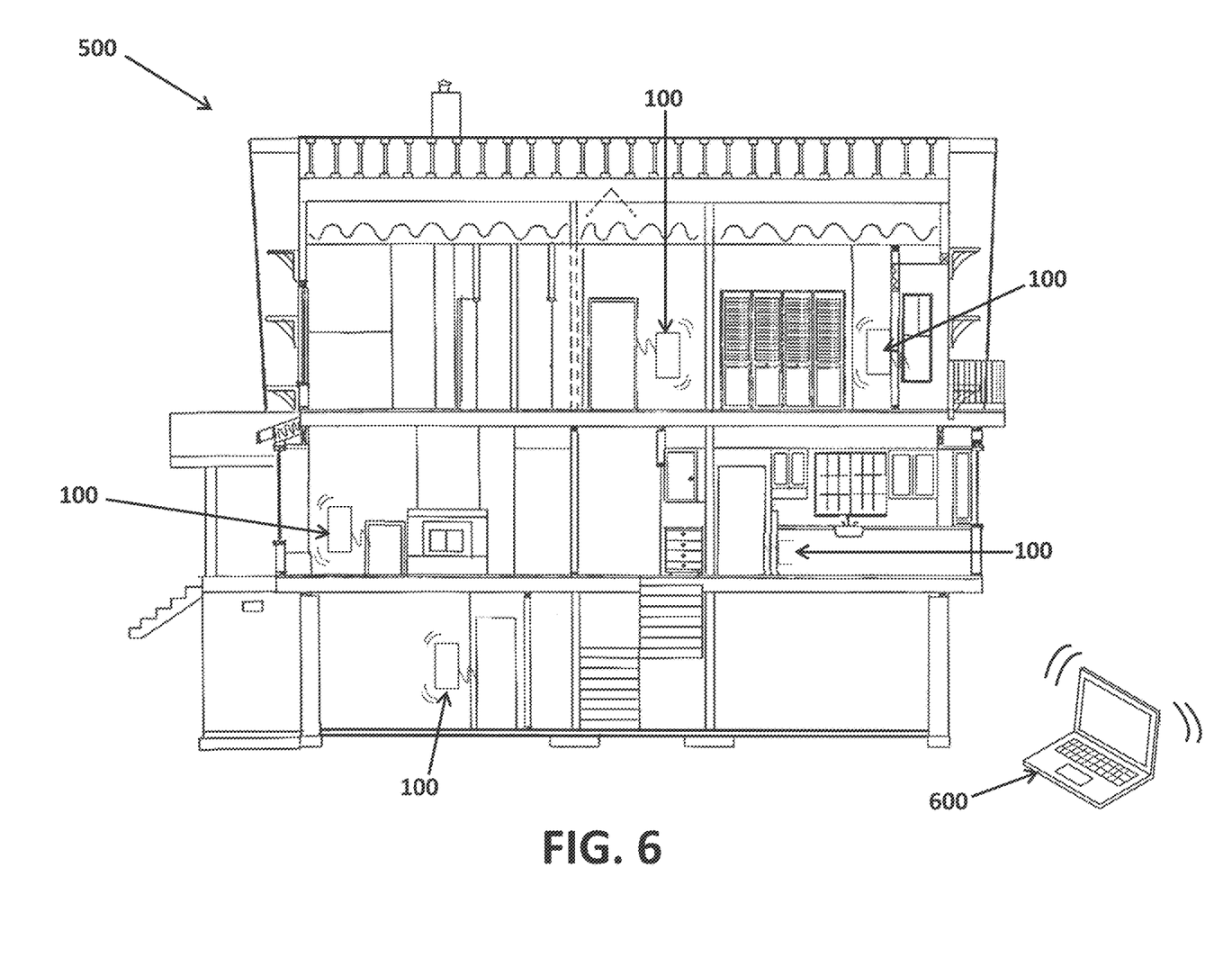
FIG. 6 shows a cut away view of a household with PCB modules attached to numerous household appliances, and a central control unit, according to an embodiment of the present invention.

Referring now to FIGS. 5 and 6, multiple apparatuses 100 are shown attached to household appliances, including an air conditioner 220, an electric stove 240, an electric water heater, and an electric pool heater, and an electric clothes dryer. As such, each apparatus 100 can communicate with the other apparatuses and respectively control each connected appliance within a household 500, thereby controlling the appliances, including algorithmically turning them on and off when appropriate (load control), in order to more efficiently use the total amount of energy within the household and avoid excessive electricity rate charges due to peak energy demand overages during "peak hours", as outlined by the user's respective energy rate plan (known as demand management). It should be noted that multiple apparatus 100 communicating together form a system, and wherein when in use the method of installing the system within a household is proprietary as well. Furthermore, a central control unit 600, commonly referred to as a user interface, which can be formed as an application or website accessible via a laptop, PC, and/or a smartphone, may also be incorporated, include proprietary software and/or applications, and be used to manage control of the system and download updated software to each individual apparatus 100. The central control unit 600 may also display the current status of each apparatus 100 along with the performance of the system and the efficiency of energy usage and demand management for the household. Though this control unit is not necessary for the proper functioning of the apparatus 100 or complete system as the system is designed, and intended, to be self-sufficient. But the degree of this self-sufficiency will ultimately be determined by any potential and/or future firmware designed for and implemented on the apparatus 100 or module, and may change if a firmware developer deems it necessary.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention.

What is claimed is:

1. A system for controlling existing household appliances and reducing energy consumption and demand through load control and demand management, comprising:
    a plurality of modules:
        wherein said plurality of modules are each adapted to be individually and releasably connected to a respective existing appliance in a household, such that information and data about a user's power usage and energy demand of each individual existing appliance can be determined; and
        wherein said plurality of modules are adapted to use WiFi networks and/or dedicated communication servers over the internet to communicate with one another in order to analyze said information and data and provide the capability to manage said user's power usage; and
    wherein each of said plurality of modules include:
        a triode for alternating current block including:
        a primary triode for alternating current;
        a plurality of terminal pads for connecting appliances thereto;
        an AC-to-DC voltage converter;
        a current sensor attached between said terminal pad and said primary triode for alternating current; and
        a triode for alternating current semiconductor;
        wherein said triode for alternating current block is adapted to track the power state, energy consumption, and overall power demand of said appliances.

2. The system of claim 1, wherein each of said plurality of modules further includes:
    a power block;
    a plurality of optotriacs; and a microcontroller adapted to provide control of said primary triode for alternating current, as well as cutoff control of any attached thermostat control lines, through said plurality of optotriacs.

3. The system of claim 2, wherein each of said plurality of modules further includes:
a USB-to-Serial adapter;
wherein said USB-to-Serial adapter is connected to said triode for alternating current block and is adapted to allow direct programming of said module.

4. The system of claim 1, further comprising:
a central control unit;
wherein said central control unit is adapted to manage control of said system and download software to each of said plurality of modules; and
wherein said central control unit is adapted to display statuses of said plurality of modules along with performance data of said system and the efficiency of energy usage and demand management of said household.

5. The system of claim 4, wherein said central control unit is chosen from a list of central control units consisting of an application, a website, a laptop, a PC, and a smartphone.

6. A method for controlling existing appliances within a household and reducing energy consumption through load control and demand management, comprising the steps of:
providing a plurality of modules;
wherein said plurality of modules are each adapted to be individually and releasably connected to a respective existing appliance in a household, such that information and data about a user's power usage of each individual existing appliance can be determined; and
wherein said plurality of modules are adapted to use WiFi networks or dedicated communication servers over the internet to communicate with one another in order to analyze said information and data and provide the capability to manage said user's power usage and demand; and
wherein each of said plurality of modules include:
a triode for alternating current block including:
a primary triode for alternating current;
a plurality of terminal pads for connecting appliances thereto;
an AC-to-DC voltage converter;
a current sensor attached between said terminal pad and said primary triode for alternating current; and
a triode for alternating current semiconductor;
wherein said triode for alternating current block is adapted to track the power state, energy consumption, and overall power demand of said appliances;
connecting respective modules to respective existing appliances in a household;
using said modules, obtaining information and data about said user's power usage of each individual existing appliance over time;
processing and analyzing said information and data and using it to determine when each said existing appliance should be turned on and off in order to more efficiently use the total amount of energy delivered to said household; and
using each respective said module to turn on and off each respective existing appliance to more efficiently use the total amount of energy delivered to said household.

7. The method of claim 6, wherein each of said plurality of modules further includes:
a power block;
a plurality of optotriacs; and
a microcontroller adapted to provide control of said primary triode for alternating current, and secondary cutoff control of connected thermostat control lines, through said plurality of optotriacs.

8. The method of claim 7, wherein each of said plurality of modules further includes:
a USB-to-Serial adapter;
wherein said USB-to-Serial adapter is connected to said triode for alternating current block and is adapted to allow direct programming of said module.

9. The method of claim 8, wherein said appliances in said household are chosen from a list of appliances consisting of an air conditioner, an electric stove, an electric water heater, an electric pool heater, and an electric clothes dryer.

10. The method of claim 6, further comprising the step of:
providing a central control unit;
wherein said central control unit is adapted to manage control of said system and download software to each of said plurality of modules; and
wherein said central control unit is adapted to display statuses of said plurality of modules along with performance data of said system and the efficiency of energy usage and demand management of said household.

11. The method of claim 10, wherein said central control unit is chosen from a list of central control units consisting of an application, a website, a laptop, a PC, and a smartphone.

* * * * *